J. J. QUERTINMONT.
GLASS FURNACE.
APPLICATION FILED AUG. 2, 1913.
1,130,536.
Patented Mar. 2, 1915.
3 SHEETS—SHEET 1.
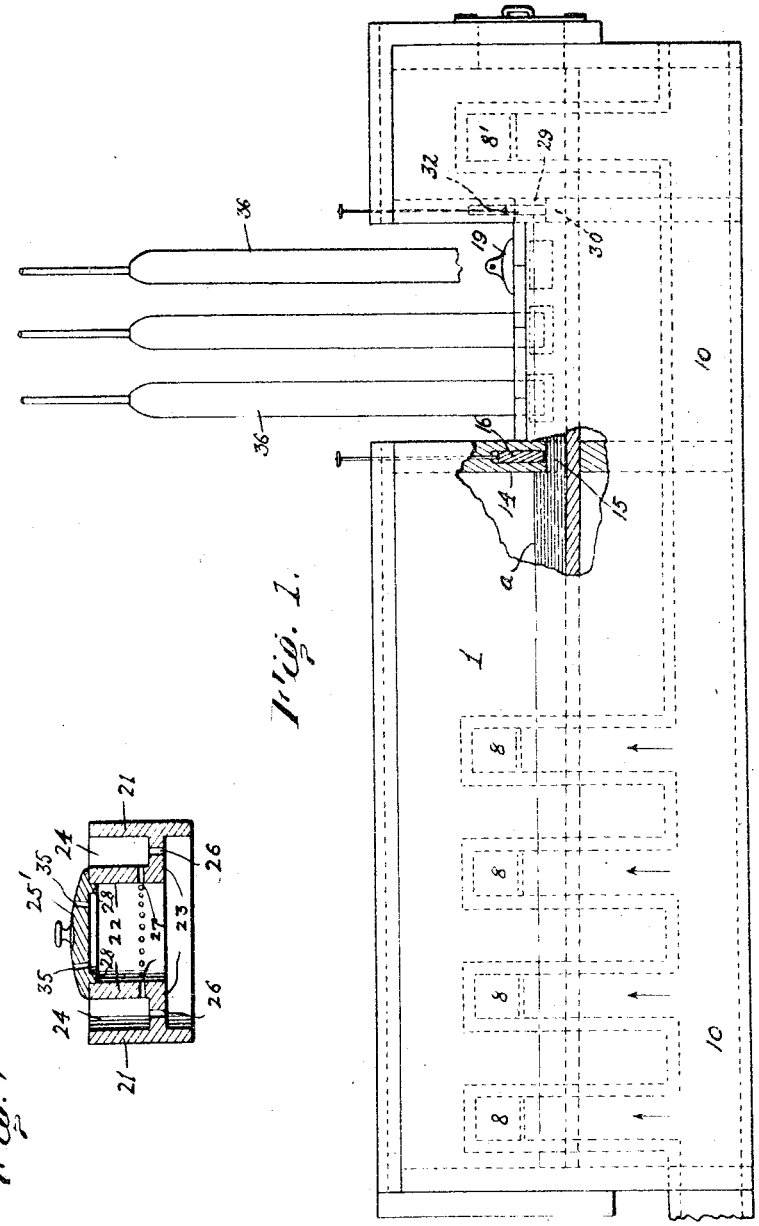

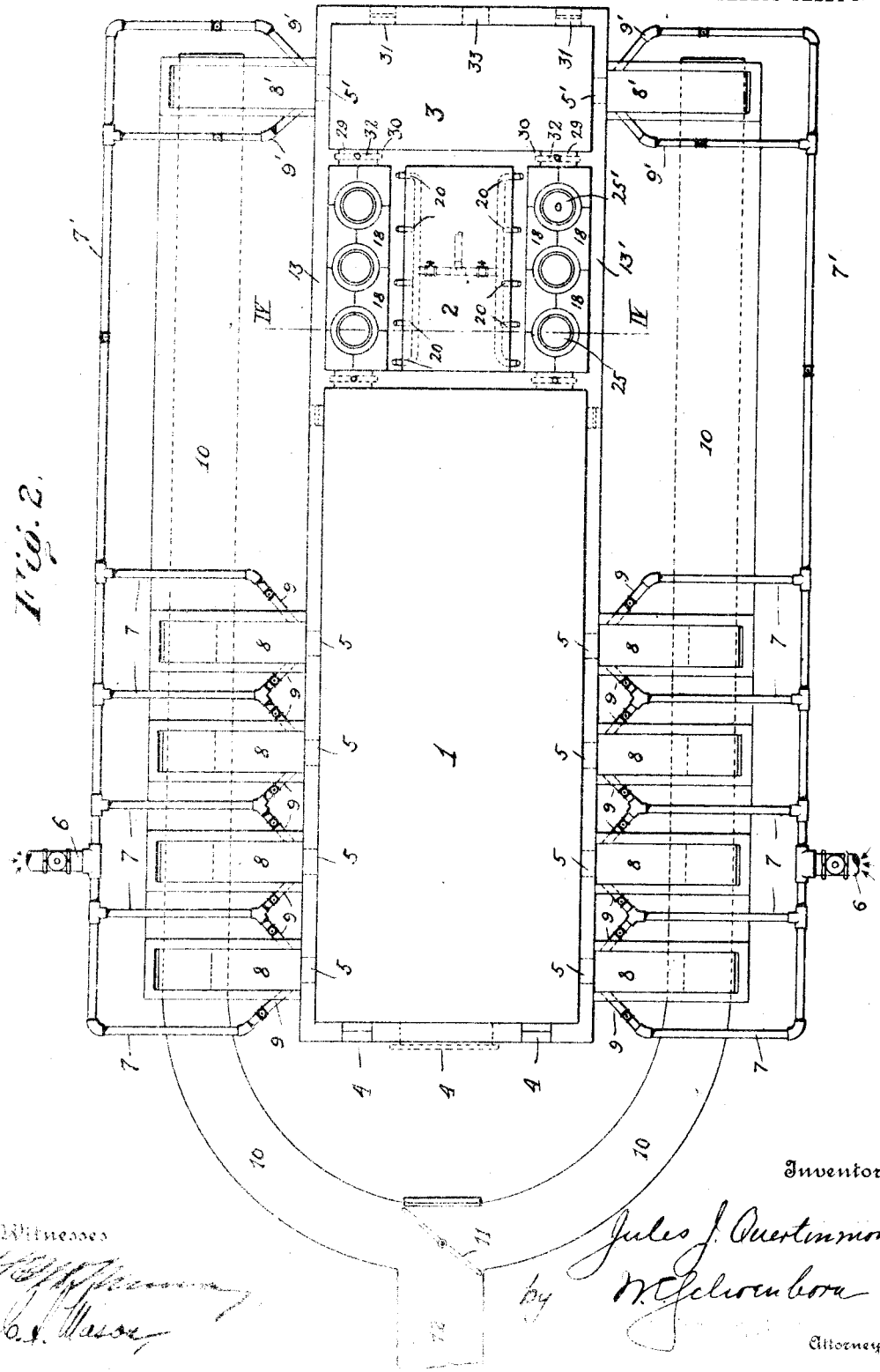

J. J. QUERTINMONT.
GLASS FURNACE.
APPLICATION FILED AUG. 2, 1913.
1,130,536.
Patented Mar. 2, 1915.
3 SHEETS—SHEET 3
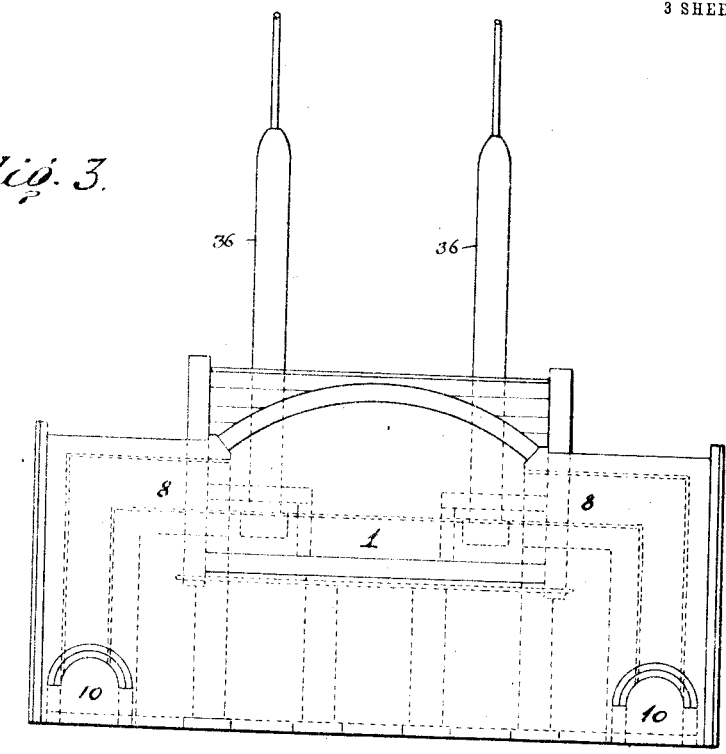
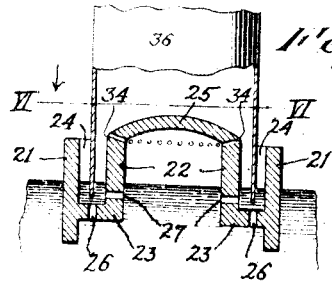
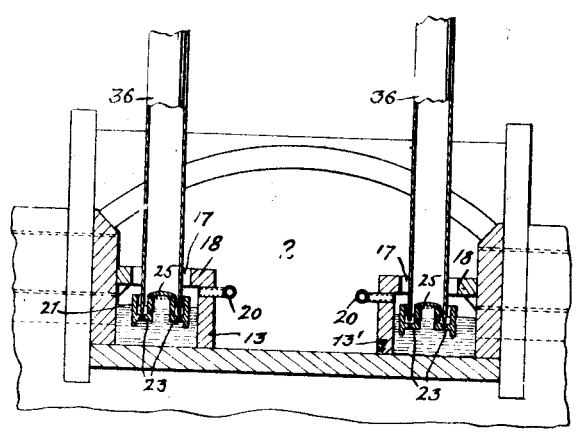
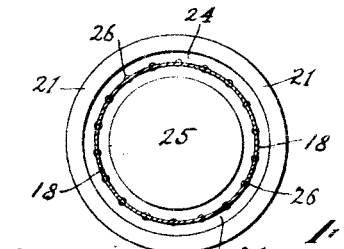
Inventor
Jules J. Quertinmont,
By W. C. Schoenborn,
Attorney
Witnesses

UNITED STATES PATENT OFFICE.

JULES J. QUERTINMONT, OF POINT MARION, PENNSYLVANIA.

GLASS-FURNACE.

1,130,536.      Specification of Letters Patent.      Patented Mar. 2, 1915.

Application filed August 2, 1913. Serial No. 782,655.

*To all whom it may concern:*

Be it known that I, JULES J. QUERTINMONT, a citizen of the United States, residing at Point Marion, in the county of Fayette and State of Pennsylvania, have invented certain new and useful Improvements in Glass-Furnaces, of which the following is a specification.

My invention relates to improvements in glass furnaces and means for drawing glass, more particularly with reference to devices for the manufacture of window glass.

The objects of my invention are first, to so construct a furnace in which the glass after being melted in a main furnace is permitted to flow to a drawing tank during which operation said glass is entirely freed of all impurities, grit or scum, and after the glass has been acted upon by the bait or drawing tool in said tank, the cooled, superfluous, or unused glass may be readily and easily removed to an attached secondary or auxiliary heating furnace to be remelted and conveyed to the primary furnace to be again mixed with the melted glass, without waste or loss of the heat remaining in the glass after being acted upon in the drawing tank. Second, to so construct the drawing tank that the introduction of the bait or drawing tool will not expose the main surface of the melted glass to the outside air, and at the same time prevent any scum or cooled surface glass from coming in contact with the bait.

With the above mentioned objects in view together with certain other incidental objects, hereinafter set forth, these improvements will now be described more in detail, with particular reference to the preferred form of the embodiment thereof, shown in the attached drawings, forming part of this specification.

The invention consists of structural features and relative arrangements of the elements, which will be hereinafter more fully described and particularly pointed out in the appended claims.

In the drawings in which similar reference characters indicate the same parts throughout the several figures of the drawings; Figure 1 is a side elevation of the furnace partly broken away to show the connection between the main furnace and the drawing tank; Fig. 2 is a plan view of the furnace; Fig. 3 is a front end view; Fig. 4 is a section on line IV—IV, of Fig. 2; Fig. 5 is an enlarged transverse sectional view of the floater scum separator used in the drawing tank, with the bait in position; Fig. 6 is a section on line VI—VI, of Fig. 5; and Fig. 7 is a sectional view of a modified form of the floater scum separator.

Referring to the drawings 1 is the primary or melting furnace, 2 is the drawing tank and 3 is the secondary or reheating chamber. The melting furnace 1 is provided with the usual charging doors or openings 4, and outlets 5, 5, for the mixed gas and air, said gas being supplied from the mains 6 and conveyed by means of the several pipes 7, 7, to the air and gas mixing chambers 8, 8, connected with the outlets 5, 5; the branches 9, 9, of the gas pipes 7, 7, being arranged at an angle, as shown, for the purpose of conveying the gas in said branches 9 and chambers 8, toward the outlets 5, 5.

10, 10, are the usual flues connecting the chambers 8, 8, with the regenerative brick work common in this class of furnaces, and are provided with the common form of valve 11 to control the passage of the air, entering by flue 12, to be heated in either of the regenerators before passing into and mixing with the gas in the corresponding mixing chambers 8, 8, which is burned in the melting chambers 8, 8, which is burned in the melting furnace 1. Connected with the melting furnace 1 is a drawing tank 2 which is preferably divided into two sections 13 and 13', said tank being so arranged that the wall 14 separating said melting furnace and tank sections, is provided with openings 15, whose upper sides are normally below the level *a* of the melted glass, so that scum or other impurities floating upon the surface of the glass will be prevented from passing into the drawing tank sections 13 and 13'. Any suitable means, as a sliding gate 16, may be employed to shut off the communication between the furnace 1 and tank sections 13 and 13', so as to prevent the molten glass in the furnace 1 from passing into the sections 13 and 13'.

The sections 13 and 13' are preferably constructed with a series of circular openings 17 at their top, said openings being formed by removable blocks 18, 18, shaped as shown, and arranged so that when placed in position they will provide the openings and at the same time be easily removed or replaced by new blocks, when repairs are necessary. The openings 17, 17, are for the purpose of receiving the bait tool for forming the cylinder of glass 36, as indicated in Figs. 1 and 4, and said openings 17, may be closed by a cover 19, as shown in Fig. 1. Said drawing tanks may be heated by the gas burners 20 for the purpose of keeping the glass in a proper state of fluidity, should it be found that the melted glass is below the proper temperature for drawing the cylinders.

Within the drawing tanks I have provided, and preferably use, a specially constructed floater, in connection with the bait, for drawing the cylinders 36, and it is primarily adapted to insure a uniform flow of clean glass of homogeneous quality and temperature toward the bottom of the glass cylinder as it is being formed, and at the same time assure that no scum or other impurities will be taken up by the cylinders, and furthermore it conserves the heat within the body of melted glass and within the tank.

Referring to Figs. 4, 5 and 6, said floater comprises an outer cylindrical section 21 and an inner cylindrical section 22, separated from and connected integrally with the outer section 21, by means of an annular extension 23, thereby forming an annular pocket or recess 24, as shown. Said inner cylindrical section 22 is provided with a top 25 having holes 34 for the purpose of permitting any air or gas to escape which might accumulate in the chamber formed by the surface of the glass cylinder 22 and top 25. 26 and 27 are holes, respectively formed in the extension 23 and lower section of the cylinder 22, for the purpose of permitting the clean glass to flow into the annular pocket 24 to be engaged by the bait. While in Figs. 5 and 6 I have shown the top 25 made integral with the inner section 22, said top may be made separate, and formed as a removable cover 25′ as shown in Fig. 7, said cover being provided with openings 35, and held from sliding off by means of the inner and annular lug 28.

Connected with the two drawing tank sections 13 and 13′ by means of suitable openings 29 is provided a secondary or reheating chamber 3 which is so arranged and constructed as to permit any superfluous or cooled glass, or impurities in said tank sections 13 and 13′, to be drawn over the separating partitions 30, into the reheating chamber 3 by means of suitable tools inserted in the openings 31, 31, in the outer wall of the chamber. The partitions 30 separating said tank sections 13 and 13′ from the reheating furnace are of such a height as to be a short distance, as for example an inch, below the normal level of the melted glass in the tank sections 13 and 13′. The openings 29 may be provided with gates 32 for the purpose of closing the passageway connecting the reheating furnace with the tank sections 13 and 13′, if so desired.

The reheating furnace 3, as shown, is smaller than the melting furnace, and the flues 10 and gas main 6, are extended so as to permit the one system of regeneration heaters to be used in connection with said reheating furnace, and provided with the mixing chambers 8′, 8′, outlets 5′, 5′, and gas branch pipes 9′, 9′, which connect with the mains 6 and pipes 7 by pipes 7′, 7′. The several gas pipes 9, 9, 9′, 9′, and 20, and branches, supplying the gas to the melting furnace, drawing tanks, and reheating chamber, are provided with valves for controlling or shutting off the gas so that either of the furnace, tanks, or chamber, or all may be cut out for the purpose of making any quick repairs or controlling the operation of the furnace.

The operation of the furnace is as follows: The melting furnace 1 having been charged, the flue valve 11 is properly set as shown in Fig. 2, the gas inlets 9, 9, on the upper side of Fig. 2 are opened and the combined gas and air issuing from the corresponding chambers 8 issuing from the outlets 5 is ignited and burns in said melting furnace 1 and fuses the charge in said furnace. The products of combustion pass through the opposite outlets 5, represented at the bottom side of Fig. 2, into the connected combining chambers 8, 8, from whence said products pass into the flue 10 to a well known and common form of regeneration brick work, not shown, and forms no part of the present invention. The bottom of the melting furnace 1 being inclined toward the drawing tanks 13 and 13′, the molten glass nearer the bottom of the tank flows toward and through the openings 15 into the drawing tanks, and any scum or other impurities floating on the surface of the glass are prevented from passing into the drawing tanks 13 and 13′ for the reason that the upper edges of the openings 15 are some distance below the upper surface of the molten glass. The pure molten glass in the tanks 13 and 13′ being in a highly fluid state, readily flows through the openings 26 and 27 of the floaters (see Figs. 4 and 5) into the pockets 24, where it may be readily attached to the baits lowered through the openings 17, raised in any suitable manner, not shown, and which forms no part of this invention, and blown in cylindrical form to be made into window glass, as readily understood by those skilled in the art. If it is desired to discontinue the use of any of the bait tools, the covers 19 may be placed over the openings 17 in order to keep out the dirt and retain the heat in the tanks.

If at any time the operator sees that the glass in the tank 13 or 13' is becoming too solid or viscous to be properly operated upon, the gas burners 20 may be started to increase the fluidity, which heat can be readily controlled by the valves controlling the gas supply. After the glass in the tank 13 and 13' has been withdrawn for a considerable time, and it is found that it is cooled down to a degree where further operation, as above described, is impossible in order to make good grade of glass, and impurities are found floating on the surface of the glass, a tool or dipper may be inserted through the openings 31 and 29, into the drawing tanks 13 or 13', and remove the cooled glass and deposit the same in the reheating furnace 3, where it can be remelted and after being sufficiently heated, be withdrawn through the openings 31, or 33, and deposited through the openings 9, in the melting furnace 1, to again gradually flow toward and into the drawing tanks 13 or 13', whereby a continuous operation is effected, without appreciable loss of heat or unused glass.

While I have shown and described a specific form of floater, as indicated in Figs. 4, 5 and 6, to be used in connection with the furnace, I do not herein make claim to said floater, as this is the subject-matter of a separate application filed by me on February 9, 1914, Serial No. 819,096.

What I claim is:—

1. A glass furnace comprising in a single structure or unit a melting furnace, a drawing tank directly connected with said melting furnace and adapted to directly receive the fluid glass from said melting furnace, and a reheating or auxiliary furnace directly connected with the drawing tank and arranged to directly receive the cooled glass from said drawing tank, the bottoms of said melting furnace, drawing tank and reheating furnace being in one plane and inclined downwardly from the melting furnace to the reheating furnace.

2. A glass furnace comprising in a single structure or unit a melting furnace, a divided drawing tank having separate and direct connections with said melting furnace and adapted to receive the fluid glass directly from said melting furnace, and a reheating or auxiliary furnace having separate and direct connections with the divided drawing tank and arranged to directly receive the cooled glass from said drawing tank, the bottoms of said melting furnace, drawing tank and reheating furnace being in one plane and inclined downwardly from the melting furnace to the reheating furnace.

3. A glass furnace comprising in a single structure or unit a melting furnace, a drawing tank directly connected with said melting tank directly connected with said melting furnace and adapted to directly receive the fluid glass from said melting furnace and provided with openings on its upper side or top, floaters in said drawing tank, and a reheating or auxiliary furnace directly connected with the drawing tank and arranged to directly receive the cooled glass from said drawing tank, the bottoms of said melting furnace, drawing tank and reheating furnace being in one plane and inclined downwardly from the melting furnace to the reheating furnace.

4. A glass furnace comprising in a single structure or unit a melting furnace, a drawing tank directly connected with said melting furnace, and a reheating furnace directly connected with said drawing tank, the bottom of the melting furnace inclined toward the drawing tank, said melting furnace and drawing tank being separated by a wall having an opening whose upper edge or side is below the normal level of the molten glass flowing from the melting tank into the drawing tank, the bottoms of said melting furnace, drawing tank and reheating furnace, being in one plane and inclined downwardly from the melting furnace to the reheating furnace.

5. A glass furnace comprising in a single structure or unit a melting furnace, a divided drawing tank directly connected with said melting furnace having openings on its upper side adapted to receive the bait, and a reheating furnace directly connected with said drawing tank, the bottom of the melting furnace inclined toward the drawing tank, said melting furnace and drawing tank being separated by a wall having an opening whose upper edge or side is below the normal level of the molten glass flowing from the melting tank into the drawing tank, the bottoms of said melting furnace, drawing tank and reheating furnace being in one plane and inclined downwardly from the melting furnace to the reheating furnace.

6. A glass furnace comprising in a single structure or unit a melting furnace, a drawing tank directly connected with said melting furnace, and a reheating furnace directly connected with said drawing tank, the bottom of the melting furnace inclined toward the drawing tank, said melting furnace and drawing tank being separated by a wall having an opening whose upper edge or side is below the normal level of the molten glass flowing from the melting tank into the drawing tank, and said drawing tank and reheating furnace being separated by a wall having an opening through which the cooled glass passes from the drawing tank into the reheating furnace, the bottoms of said melting furnace, drawing tank and reheating furnace being in one plane and inclined downwardly from the furnace to the reheating furnace.

In testimony whereof I affix my signature in presence of two witnesses.

JULES J. QUERTINMONT.

Witnesses:
A. A. DE BROCY,
M. B. EFAW.